R. H. SMITH.
RELEASING DEVICE FOR LOADERS AND THE LIKE.
APPLICATION FILED JAN. 21, 1911.
990,916.
Patented May 2, 1911.
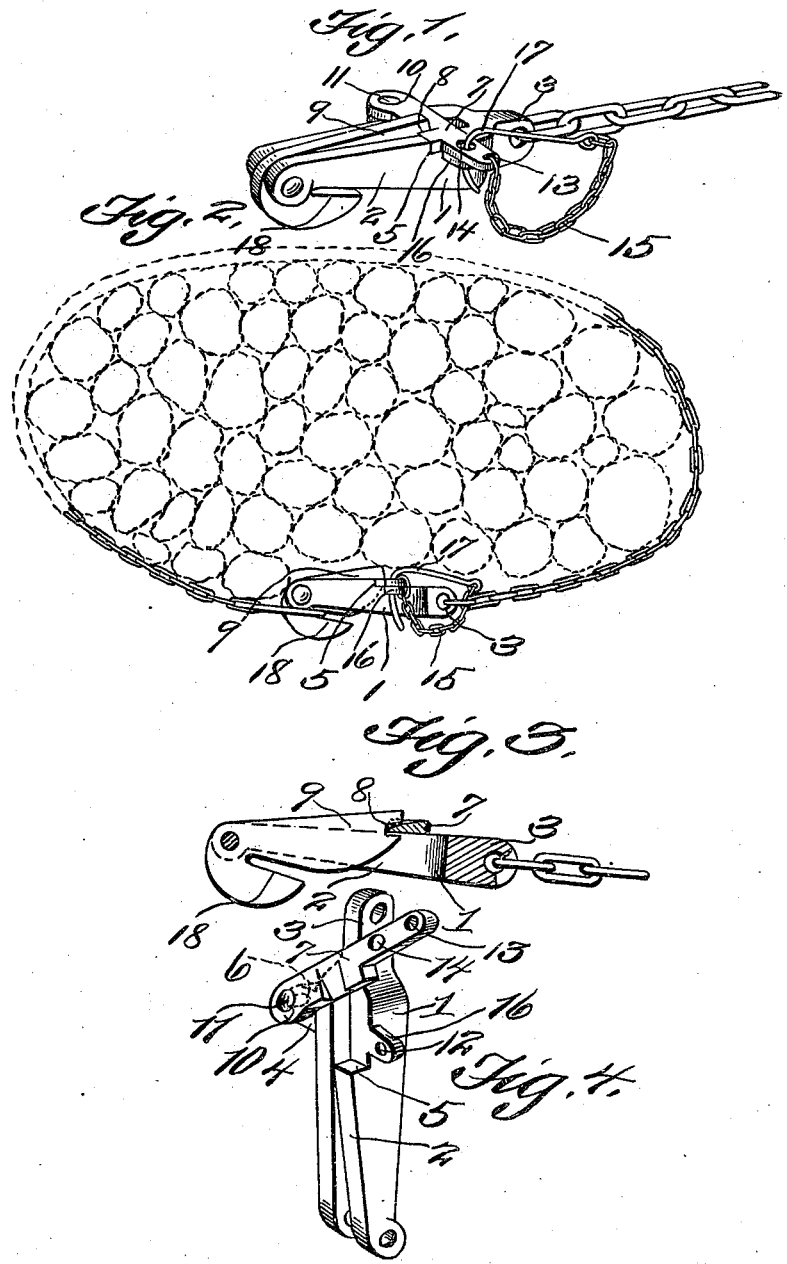

UNITED STATES PATENT OFFICE.

ROBERT H. SMITH, OF GLEASON, WISCONSIN.

RELEASING DEVICE FOR LOADERS AND THE LIKE.

990,916.  Specification of Letters Patent.  Patented May 2, 1911.

Application filed January 21, 1911. Serial No. 603,966.

*To all whom it may concern:*

Be it known that I, ROBERT H. SMITH, a citizen of the United States, residing at Gleason, State of Wisconsin, have invented a new and useful Releasing Device for Loaders and the Like; and I do hereby declare the following to be a full, clear, and exact description of the invention, such as will enable others skilled in the art to which it appertains to make and use the same.

This invention relates to the art of releasing devices and logging hooks.

The principal object of the invention is to simplify the general construction of such devices, and to provide a novel means for locking the holding jaw.

The device may not only be used for holding a chain about a load of logs, but may also be used as a releasing device, for releasing any part of a harness from the vehicle.

The invention comprises further features and combination of parts hereinafter set forth, shown in the drawings and claimed.

In the drawings:—Figure 1 is a perspective view of the device on an enlarged scale. Fig. 2 is a view in side elevation of the logging hook or releasing device, showing in dotted lines, the manner for holding a load of logs together. Fig. 3 is a sectional view longitudinally through the logging hook. Fig. 4 is a detail view of the body of the hook, showing the lever for holding the locking jaw or hook in a locked position.

Referring to the drawings, 1 designates the body of the hook, which comprises the bifurcated portion 2 and the apertured extension 3. Projecting laterally of the body is an ear 4 having an aperture 6. The under face of the body on one of the arms formed by the bifurcation is a shoulder 5, against which the releasing lever contacts, when the same is in locked relation with the notch 8 of the locking jaw or hook 9. This releasing lever 7 at one end thereof has an aperture 10, through which and the aperture of the ear a pin 11 extends, thus constituting a pivot for the lever.

The body is provided with an additional ear having an aperture 12. The free end of the releasing lever is provided with two apertures 13 and 14, the aperture 13 is adapted to receive a ring of the short chain 15, while the aperture 14 is designed to be brought in registration with the aperture 12 of the ear 16. When the apertures 12 and 14 are brought in registration a hook is inserted through them, to hold the releasing lever in a locked position. This hook 17 is carried at the free end of the short chain, as shown in Fig. 1.

The holding jaw or hook is provided with a hook portion 18, which is off set from the pivot of the holding jaw or hook, so that when the releasing lever is disengaged from the notch, the holding jaw or hook will be free to open, which will undoubtedly occur because of the fact that the hook portion is off set from the pivot of the holding jaw, and by virtue of the pressure on the hook portion the jaw will open.

From the foregoing it will be obvious that this logging hook or releasing device is rather simple in construction; all the operative parts are comparatively compact, and are few in number. The hook can be quickly released by means of the releasing lever, and furthermore the device is comparatively simple in construction, and can be manufactured at a comparatively slight cost. The device not only has the above features and advantages, but is strong, durable and efficient in use.

The invention having been set forth, what is claimed as new and useful is:—

In a device as set forth, a bifurcated body member, having an ear projecting laterally from each side, and provided with a shoulder, a hook pivoted in the bifurcation of the body member and provided with a notch, a lever pivoted to one of the ears and adapted to engage the notch, the free end portion of the lever and the other ear having apertures, and means insertible through the apertures for holding the lever in locked relation with the notch.

In testimony whereof I have signed my name to this specification in the presence of two subscribing witnesses.

ROBERT H. SMITH.

Witnesses:
PAUL HAHN,
GEO. B. THOMSON.

---

Copies of this patent may be obtained for five cents each, by addressing the "Commissioner of Patents, Washington, D. C."